July 13, 1948.  A. T. CAPE ET AL  2,444,916
REDUCTION OF IRON ORES
Filed April 21, 1944
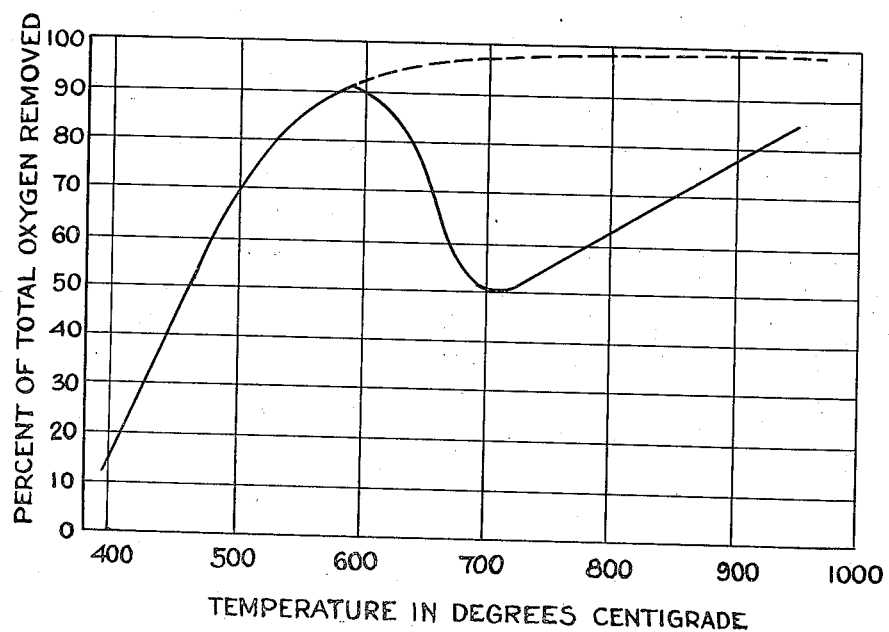
INVENTORS.
ARTHUR T. CAPE AND
CHARLES V. FOERSTER.
BY Fay, Golrick, Chilton & Isler.
Attorneys.

Patented July 13, 1948

2,444,916

UNITED STATES PATENT OFFICE 2,444,916

REDUCTION OF IRON ORES

Arthur T. Cape, Columbus, and Charles V. Foerster, Canton, Ohio, assignors to Coast Reduction, Inc., Watsonville, Calif., a corporation of Delaware Application April 21, 1944, Serial No. 532,054

4 Claims. (Cl. 75—34)

This invention relates, as indicated, to the reduction of iron ores by means of gaseous reducing agents, but has reference more particularly to the reduction of magnetite and ores in which magnetite is a predominating constituent.

In United States Patent No. 2,379,423, there is disclosed a method of effecting the reduction of iron ores by means of coke oven and other gases relatively high in hydrogen, at temperatures of from about 900° F. to about 1350° F. It is stated in said patent that within this rather low temperature range, the carbon monoxide in the gas decomposes to form carbon dioxide and carbon, and that it is essential for this reason to maintain the carbon monoxide content of the gas below a predetermined value. It is also stated that at temperatures above about 1350°, the methane in the gas begins to decompose, necessitating the observance of precautions in the use of the upper portion of the above reducing temperature range.

We have discovered that by mixing the ore, prior to reduction, with a small quantity of a compound selected from the group consisting of sodium, potassium, and barium, especially the carbonates of these elements and more particularly sodium carbonate, and in such a manner as to form on all of the lumps or particles of the ore, a layer of discrete particles or discontinuous areas of such compound that the rate of reduction can be greatly accelerated, and that the temperature for the reduction can be increased to a considerable extent, i. e., up to about 1500° F., so as to obviate the decomposition of the carbon monoxide at low temperatures. At the same time, we find that the use of such compound in small quantities permits the use of increased reducing temperatures without danger of decomposing the methane in the reducing gas.

More specifically, we have found that these results can be attained by using quantities of such compounds which are so small as to involve little or virtually no increase in the cost of reduction. These quantities may vary from 0.25% to 2.00% by weight of the ore to be reduced. In most cases, however, about 1% will be used.

While most compounds of the above-named elements have been found suitable for the purpose, we have secured excellent results through the use of carbonates of the elements, and more especially sodium carbonate.

The compound is intimately mixed with the ore, and the mixture then caused to traverse a reducing furnace, preferably in countercurrent relation to the reducing gas, which may be pure hydrogen, coke oven gas, retort coal gas, oil gas, or other gas relatively high in hydrogen. Moreover, the ore-compound mixture may be subjected to reduction in a multiple-hearth type furnace, in the manner described in United States Patent No. 2,382,395.

In order to attain the desired results, certain precautions should be observed in the mixing of the ore with the compound in question. These may be enumerated as follows:

(1) The mixing must be effected in such a manner as to form on each lump or particle of the ore a layer consisting of discrete particles or discontinuous areas of the compound.

(2) A substantial portion of the surface of each and every grain must be covered with the compound.

(3) To obtain the maximum effect, the particles of the compound must be of a size comparable with that of chemically-precipitated materials. In other words, coarse grains or particles cannot be used.

(4) An especially desirable method of forming the layer is to mix the very finely divided compound with the ore, and then wet the ore so that the surfaces of the ore particles are covered with the compound. When the moisture is subsequently evaporated, the compound will be found to be spread over the surfaces of the ore particles in the desired manner.

(5) The coating or layer of the compound on the ore particles or grains must not be continuous since this has been found to completely stop the reaction. The use of too large a quantity of the compound, i. e., in excess of 2%, is therefore to be avoided, since large quantities tend to form such continuous layers. The importance of this factor is illustrated by experiments with a single crystal of the ore at a reducing temperature in a stream of hydrogen. In one case, a crystal was coated on a portion of one face thereof with a thick (continuous) layer of sodium carbonate. It was found that the reduction under the layer was only slight, but that at the edges of the layer, substantial reduction had taken place. In the other case, a thin (discontinuous) layer of sodium carbonate had been applied to a portion of one face of the crystal, and it was found that uniform reduction had taken place under all portions of such layer.

(6) Sodium carbonate tends to make the grains of ore stick together, particularly after the reduction, but barium carbonate does not cause such sticking. For practical purposes, therefore, mixtures of sodium and barium carbonate can be effectively used, or mixtures of sodium carbonate with alumina, finely divided magnesia, or calcium carbonate, etc.

(7) Water in as small amounts as possible should be present in the admixture of ore grains and the compound in question, since if the ore is excessively wet at the time it is introduced into the reducing furnace, an undesirable condensation of water from the reducing gas will occur. In any event, the compound should not be mixed with ore which is unduly wet. Stated in another way, the temperature and moisture conditions in the reduction system must be maintained so as to prevent precipitation of moisture or water vapor from the gas onto the ore, which would, in turn, cause the compound to be washed off the ore grains and thereby nullify the effect of the compound.

The effect of the use of about 1% sodium carbonate in the ore mixture to be reduced is graphically illustrated in the accompanying drawing, wherein the degree of reduction of magnetite is plotted against temperature of reduction.

It will be seen from the graph that in the situation in which a carbonate is not added to the ore, the maximum degree of reduction occurs at approximately 600° C., but falls off fairly rapidly at temperatures above this, falling to a minimum of 50% at about 700° C., and then rising slowly again at temperatures above 700° C. In the case where about 1% sodium carbonate has been mixed with the magnetite, the degree of reduction rises rapidly until a temperature of about 600° has been attained, but at higher temperatures, there is no falling off in the degree of reduction. Instead, the degree of reduction increases by minute increments, asymptotically approaching 100% as a maximum.

Although the process has been described as applicable to the reduction of iron ores generally by means of gaseous reducing agents, its use is particularly advantageous in the treatment of magnetite, the results described with reference to the above curve having been attained only in the case of magnetite. In the treatment of hematite, the result is not as pronounced as described in connection with said curve.

We claim:

1. The method of reducing iron ore which consists in mixing intimately with the ore particles a carbonate of the group consisting of sodium, potassium, and barium, the amount of such carbonate being from .25% to 2% by weight of the ore, wetting the ore-carbonate mixture so that when the moisture is subsequently evaporated the surfaces of the ore particles are covered with a layer of discrete particles or discontinuous areas of the carbonate, and then subjecting the coated ore particles to the action of a gaseous reducing agent.

2. The method of reducing iron ore which consists in mixing sodium carbonate intimately with the ore particles, the amount of sodium carbonate being from .25% to 2% by weight of the ore, wetting the ore-carbonate mixture so that when the moisture is subsequently evaporated the surfaces of the ore particles are covered with a layer of discrete particles or discontinuous areas of the carbonate, and then subjecting the coated ore particles to the action of a gaseous reducing agent.

3. The method of reducing iron ore which consists in mixing intimately with the ore particles a carbonate of the group consisting of sodium, potassium, and barium, the amount of such carbonate being from .25% to 2% by weight of the ore, said mixture having incorporated therein water in sufficient quantity such that when it is subsequently evaporated the surfaces of the ore particles are covered with a layer of discrete particles or discontinuous areas of the carbonate, and then subjecting the coated ore particles to the action of a gaseous reducing agent.

4. The method of reducing iron ore which consists in mixing sodium carbonate intimately with the ore particles, the amount of sodium carbonate being from .25% to 2% by weight of the ore, said mixture having incorporated therein water in sufficient quantity such that when it is subsequently evaporated the surfaces of the ore particles are covered with a layer of discrete particles or discontinuous areas of the carbonate, and then subjecting the coated ore particles to the action of a gaseous reducing agent.

ARTHUR T. CAPE.
CHARLES V. FOERSTER.

REFERENCES CITED

The following references are of record in the file of this patent:

UNITED STATES PATENTS

| Number | Name | Date |
|---|---|---|
| 1,481,357 | Dwight | Jan. 22, 1924 |
| 2,085,178 | Acken | June 29, 1937 |

OTHER REFERENCES

Industrial and Engineering Chemistry, vol. 24, No. 12, pages 1397 to 1400.